Oct. 25, 1949.   G. LAUBE ET AL   2,486,040
MOTION-PICTURE FILM SPLICER
Filed Dec. 10, 1945   2 Sheets-Sheet 1

INVENTORS
GROVER LAUBE
WILLIAM A. WOOTTEN
BY
ATTORNEY

Oct. 25, 1949.　　　G. LAUBE ET AL　　　2,486,040
MOTION-PICTURE FILM SPLICER

Filed Dec. 10, 1945　　　　　　　　　　2 Sheets-Sheet 2

INVENTORS
GROVER LAUBE
WILLIAM A. WOOTEN

BY
ATTORNEY.

Patented Oct. 25, 1949

2,486,040

UNITED STATES PATENT OFFICE 2,486,040

MOTION-PICTURE FILM SPLICER

Grover Laube and William A. Wootten, Los Angeles, Calif., assignors to Twentieth Century-Fox Film Corporation, Los Angeles, Calif., a corporation of New York Application December 10, 1945, Serial No. 633,902

10 Claims. (Cl. 154—42.1)

1

This invention relates to the motion picture art and deals with a means applicable to the standard 35 mm. film splicing machine used in this art whereby the standard machine may be converted to a 16 mm. film splicer or may be used as a standard 35 mm. film splicer as desired.

In ordinary practice throughout the motion picture industry, 35 mm. film is edited after being processed by cutting out various sections and joining the cut ends by means of accurate standardized splices. These splices are customarily made upon a 35 mm. film splicing machine which is a complicated piece of mechanism well known in the art. Due to the fact that more and more 16 mm. film is coming into use in professional motion picture work, a need has arisen for a satisfactory method of splicing 16 mm. film as well as 35 mm. film without duplicating the relatively bulky equipment required for this work. It is therefore the object of our invention to provide a simple, inexpensive means for modifying a standard 35 mm. film splicing machine so that it will function either as a 16 mm. film splicing machine or as a 35 mm. film splicer, thereby eliminating the need for additional complicated equipment in studio cutting rooms for performing this service.

Further objects and advantages will become evident as the description proceeds in conjunction with the drawing, in which.

Figure 1:
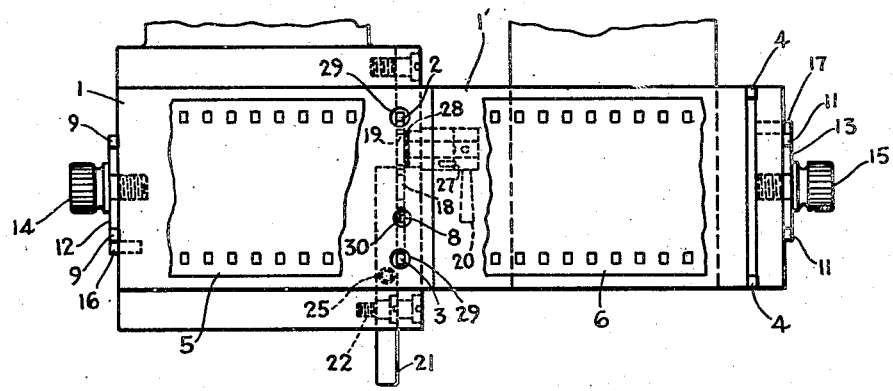
Figure 1 is a plan view of the film locating mechanism upon which fragmentary parts of 35 mm. film are shown for splicing.
Figure 2:
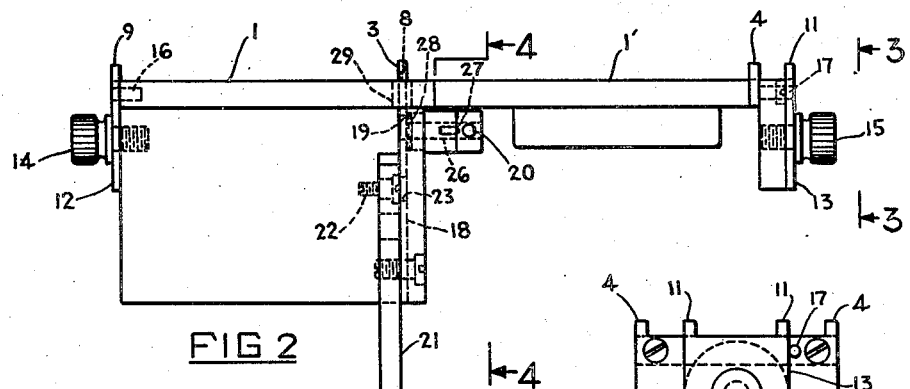
Figure 2 is a front elevation of Figure 1.
Figure 3:
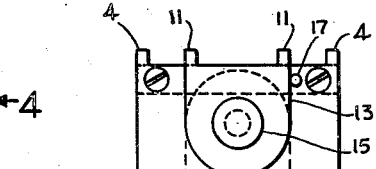
Figure 4:
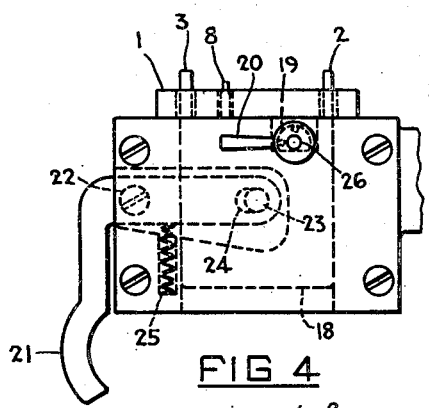
Figure 5:
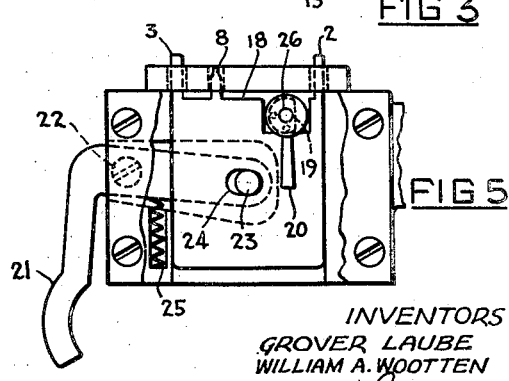
Figure 6:
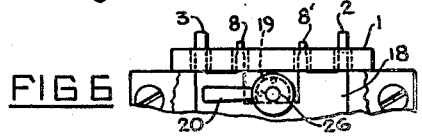
Figure 7:
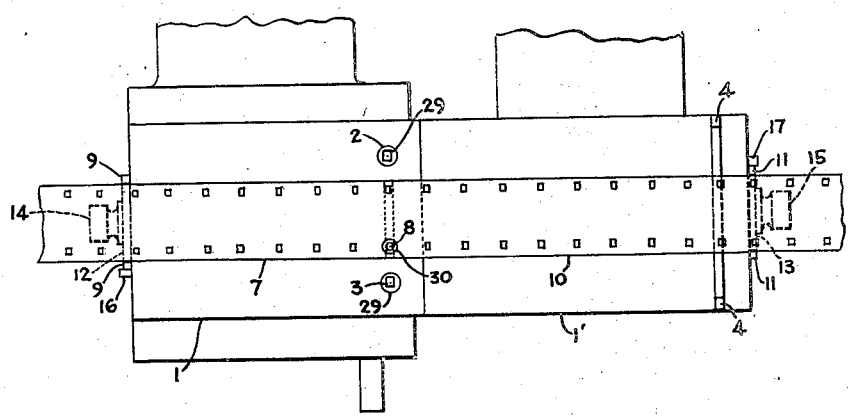
Figure 8:
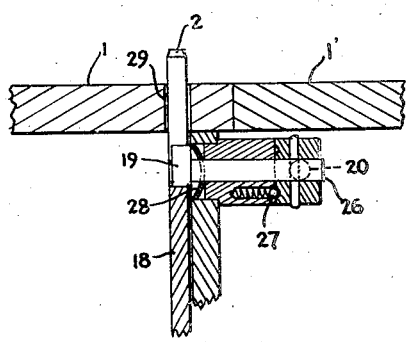

Figure 3 is a right end elevation of Figure 2, looking in the direction of arrows 3—3 of Figure 2, showing both 16 mm. and 35 mm. guide plates;

Figure 4 is a section taken on line 4—4 in Figure 2;

Figure 5 is a view similar to Figure 4 with part of the cover plate removed to show the operation of the film locating pin plate;

Figure 6 is a fragmentary view similar to Figures 4 and 5 and shows a slightly modified form of our invention;

Figure 7 is a view similar to Figure 1 showing how 16 mm. film would be spliced; and Figure 8 is an enlarged longitudinal section of the cam arrangement showing parts 19, 20, 26, and 27 more in detail.

Briefly stated, this invention covers a film splicing plate having film locating pins whereby either 16 mm. or 35 mm. film, or any other combination of films, may be accurately located and guided for splicing. The slicing operation itself

2 is not a part of this invention. As illustrated in the various views, the device comprises means for accurately locating two strips of 35 mm. film for splicing together, and additional means for accurately placing two strips of 16 mm. film for splicing together on the same machine. The said means for locating 16 mm. film is easily and quickly placed in an out-of-the-way position when not in use to prevent its interfering with the operation of splicing 35 mm. film.

Referring to Figure 1, the plate generally designated 1 supports the end of a 35 mm. film strip 5 which is introduced from the left side and placed on locating pins 2 and 3 which project through holes 29 in plate 1 and into opposite sprocket holes in the film 5. A 35 mm. film strip end 6 is then brought in from the right side and placed on the same locating pins 2 and 3. Film 6 is guided between two upstanding projections 4 and is now precisely aligned with film strip 5 for splicing. The foregoing is general customary procedure for locating and aligning two pieces of film for splicing.

In splicing 16 mm. film on the same machine, additional means are provided for aligning and guiding the two ends of the film to be joined (see Figure 7). A 16 mm. film strip end 7 is brought in from the left, placed on support plate 1, and located on pin 8 which projects through a hole 30 in plate 1 and into a sprocket hole in the film. It is to be understood that one or more pins may be used for the purpose of locating the film as shown in Figure 6. Film 7 is held between upstanding projections 9. Another 16 mm. film 10 to be spliced to the one on the left is introduced from the right, placed on pin 8 by means of a sprocket hole in the film and guided between upstanding ears 11 on plate 13. While the preferred form of our invention is shown with guide plates 12 and 13, the use of a plurality of locating pins 8 and 8', Figure 6, will make the machine operate satisfactorily without the guide plates. It can be seen that the conventional pins 2 and 3 and upstanding guides 4 do not interfere with 16 mm. film while it is being applied for splicing.

In order to obviate interference with the operation of splicing 35 mm. film, the means for aligning and guiding 16 mm. film are manually adjustable to an out-of-the-way position when not in use. Upstanding guides 9 and 11 are projections of plates 12 and 13 respectively, better shown in Figure 3. Plates 12 and 13 are rotatably mounted on plates 1 and 1' respectively and held in position against stop pins 16 and 17 by means of thumb screws 14 and 15 respectively. While 35 mm. film is being spliced, plates 12 and 13 are rotated around their holding screws and dropped down as indicated in dotted lines, Figure 3. It can be seen in Figure 4 and Figure 5 that film locating pins 2, 3, and 8 are upstanding projections and extensions of plate 18 which may be held in two positions by means of cam 19. The handle 20 operates cam 19 through shaft 26 and is held in position by the detent 27 and curved spring washer 28. This feature is shown in Figure 8. When cam 19 is placed in the position shown in Figure 4, it allows plate 18 to rise until pin 8 projects above the surface of plate 1 far enough to serve as a locating pin for 16 mm. film. Pin 8 may be retracted by placing cam handle 20 in position shown in Figure 5, thus holding pin 8 beneath the surface of plate 1 and allowing 35 mm. film to be placed on plates 1 and 1' without interference with said pin. It is pointed out that pins 2 and 3, which are the conventional locating pins for 35 mm. film, are long enough to remain above the surface of plate 1 when sliding pin plate 18 has been partially lowered as in Figure 5 by means of cam 19 to a position where pin 8 does not appear above the surface of plate 1. The handle 21 held by pivot screw 22 is employed to lower plate 18, by means of pin 23 operating in slot 24, still farther for the purpose of stripping the film off of the locating pins 2 and 3 or 8 after a splice has been completed. The actuating end of handle 21 is urged upward by the spring 25 which causes sliding plate 18 to maintain constant pressure against cam 19. It can thus be seen that by partially lowering or raising pin 8 by means of cam 19 and by placing guide plates 12 and 13 in their proper positions, either 16 mm. or 35 mm. film may be accurately located for splicing.

We claim:

1. In a motion picture film splicing machine, a plate adapted to receive strips of film to be spliced, a pin carrying plate having a set of long locating pins adapted to project through said plate and fit in sprocket holes of said film strips, a second set of short locating pins mounted on said pin carrying plate adapted to project through said plate and fit in sprocket holes of film of another width to be spliced, and means for moving said pin carrying plate to cause said first mentioned pins to project through said plate prior to said second mentioned set of pins.

2. In a motion picture film splicing machine, a plate adapted to receive the ends of strips of film to be spliced, a pin carrying plate having a set of long locating pins adapted to project through said plate and fit in sprocket holes of said film strips, a second set of short locating pins mounted on said pin carrying plate adapted to project through said plate and fit in sprocket holes at the ends of strips of film of another width to be spliced, means for moving said locating pins to cause said first mentioned pins to project through said plate prior to said second mentioned set of pins, and means for optionally stopping the movement of said pins to prevent said second set of pins projecting through said plate.

3. In a motion picture film splicing machine, a plate adapted to receive film, a pin carrying plate having a set of long locating pins adapted to project through said plate and fit in sprocket holes in film on said plate, a second set of short locating pins adapted to project through said plate and fit in sprocket holes in another width film, and means for retracting said second mentioned film locating pins substantially below the surface of said film receiving plate and leaving said first mentioned film locating pins projecting through said plate.

4. In a motion picture film splicing machine, a plate adapted to receive film to be spliced, a spring-pressed, reciprocably mounted slide bar having a long set and a short set of film locating pins thereon arranged to project through openings in said plate, and manually controlled cam means for predetermining the movement of said reciprocably mounted slide bars to allow only the long set of pins to project through said plate.

5. In a motion picture film splicing machine, a plate adapted to receive film to be spliced, a spring-pressed, reciprocably mounted slide bar having two sets of film locating pins thereon adapted to pass through openings in said plate, means for normally forcing said pins to project through said openings in said plate, one of said sets of pins being shorter than the other, and manually operable cam means for adjusting the movement of said slide bar so that the shorter set of pins will be held beneath the surface of said plate while the longer set projects through said plate.

6. In a motion picture film splicing machine, a plate adapted to receive film to be spliced, a reciprocably mounted slide bar having two different length sets of film locating pins thereon adapted to pass through openings in said plate, means for normally forcing said pins to project through said openings in said plate, and means for holding said bar in a fixed predetermined position whereby the set of shorter pins will be held beneath the surface of said plate and the set of longer pins will project therethrough.

7. In a motion picture film splicing machine, a plate adapted to receive film to be spliced, a reciprocably mounted slide bar having two different length sets of film locating pins thereon adapted to pass through openings in said plate, means for normally forcing said pins to project through said openings in said plate, and means for holding said bar in a fixed predetermined position whereby the set of shorter pins will be held beneath the surface of said plate and the set of longer pins will project therethrough, said last mentioned means including a manually operated cam having two positions thereon for holding said bar, one whereby only the set of longer pins project through said plate and the other whereby both sets of pins project through said plate.

8. In a motion picture film splicing machine a film receiving plate, a pin carrying plate movable relative to said film receiving plate, said pin carrying plate having two sets of film locating pins thereon of different lengths adapted to engage sprocket holes in film of different widths respectively, and means for selectively adjusting the movement of said pin carrying member relative to said film receiving plate so that one set of pins or both sets of pins projects through said film receiving plate.

9. In a motion picture film splicing machine a film receiving plate, a pin carrying plate having a set of long pins and a set of short pins thereon adapted to engage sprocket holes in films of different widths respectively, means for moving said pin carrying plate relative to said film receiving plate to project said sets of pins through said film receiving plate, and means for stopping the movement of said pin carrying member so that the set of long pins only projects through said film receiving plate.

10. In a motion picture film splicing machine a film receiving plate, a pin carrying plate having a set of long pins and a set of short pins thereon adapted to engage sprocket holes in films of different widths respectively, means for moving said pin carrying plate relative to said film receiving plate to project said sets of pins through said film receiving plate, and means for selectively adjusting the movement of said pin carrying plate so that only the set of long pins projects through said film receiving plate or both long and short set of pins project through the said plate at the same time.

GROVER LAUBE.
WILLIAM A. WOOTTEN.

REFERENCES CITED

The following references are of record in the file of this patent:

UNITED STATES PATENTS

| Number | Name | Date |
|---|---|---|
| 1,275,431 | Howell | Aug. 13, 1918 |
| 1,396,895 | Stolz | Nov. 15, 1921 |
| 1,806,887 | Bruno | May 26, 1931 |
| 1,981,332 | Rohrdanz | Nov. 20, 1934 |
| 2,295,759 | Suter | June 9, 1942 |

FOREIGN PATENTS

| Number | Country | Date |
|---|---|---|
| 288,123 | Great Britain | Apr. 19, 1928 |